United States Patent [19]

Kwon et al.

[11] Patent Number: 6,055,087
[45] Date of Patent: Apr. 25, 2000

[54] PHOTO-INDUCED ELECTRO-OPTIC OSCILLATOR USING A MULTIPLE QUANTUM WELL PIN DIODE

[75] Inventors: O Kyun Kwon; Kyu Seok Lee; Hye Yong Chu, all of Daejeon, Rep. of Korea

[73] Assignee: Electronics and Telecommunications Research Institute, Daejeon, Rep. of Korea

[21] Appl. No.: 09/118,958

[22] Filed: Jul. 17, 1998

[30] Foreign Application Priority Data

Nov. 17, 1997 [KR] Rep. of Korea ............... 97-60633

[51] Int. Cl.[7] ............................................. G02F 1/015
[52] U.S. Cl. .................................... 359/248; 359/254
[58] Field of Search .................................. 359/248, 250, 359/251, 254

[56] References Cited

U.S. PATENT DOCUMENTS

| | | | |
|---|---|---|---|
| 5,126,553 | 6/1992 | England et al. | 250/211 |
| 5,226,814 | 7/1993 | Inata et al. | 257/25 |
| 5,416,338 | 5/1995 | Suzuki et al. | 257/21 |
| 5,446,293 | 8/1995 | Chu et al. | 257/21 |
| 5,663,572 | 9/1997 | Sakata et al. | 257/25 |
| 5,670,385 | 9/1997 | Chu | 437/5 |

OTHER PUBLICATIONS

David A. B. Miller, Daniel S. Chemla, Theodore C. Damen, Thomas H. Wood, Charles A. Burrus, Jr., Arthur C. Gossard and William Wiegmann, "The Quantum Well Self–Electoopic Effect Device: Optoelectronic Bistability and Oscillation, and Self–Linearized Modulation", *Reprinted from IEEE J. Quant. Electron. vol.* QE–21, No. 9. pp. 1462–1476, Sep. 1985, pp. 135–148

C. Kinder, I. Mehdi, J.R. East and G.I. Haddad "Power and Stability Limitations of Resonant Tunneling Diodes", *IEEE Transactions on Microwave Theory and Technologies*, vol. 38, No. 7, Jul. 1990, pp. 864–872.

*Primary Examiner*—Georgia Epps
*Assistant Examiner*—Margaret Burke
*Attorney, Agent, or Firm*—Cohen, Pontani, Lieberman & Pavane

[57] ABSTRACT

A photo-induced electro-optic oscillator using a multiple quantum well structure PIN diode using a negative resistance characteristic of a photocurrent-voltage is disclosed. The present invention can generate the modulated optical signal as well as the electrical AC signal of a high output by using the multiple quantum well structure having the electro-absorption as the intrinsic layer of the PIN diode, regulate the electrical AC signal frequency and signal amplitude by means of regulating the PIN diode and electrical elements, regulate the modulated optical signal frequency and the modulated signal difference and extinction ratio by means of regulating the multiple quantum well structure, as a result, to generate the electrical and optical signal of a high output, high frequency.

13 Claims, 6 Drawing Sheets

PHOTO-INDUCED ELECTRO-OPTIC OSCILLATOR USING A MULTIPLE QUANTUM WELL PIN DIODE

BACKGROUND OF THE INVENTION

1. Field of the Invention

The present invention relates to an electrical oscillator and optical modulator, and more particularly to a photo-induced electro-optic oscillator using a multiple quantum well structure PIN diode which simultaneously performs an optical signal modulation and a high frequency electrical signal generation by means of a same frequency from an optical PIN(P-type semiconductor/Intrinsic/N-type semiconductor) diode single integrated device having a photo signal processing function different from that a prior electrical oscillator and optical modulator separately process an electrical and optical signal.

2. Description of the Prior Art

Generally, a microwave oscillator and an optical modulator are very important basic devices as the function of an electrical and optical signal generator in an information communication and optical information process.

A tunnel diode, a backward diode are used as a diode structure of a conventional electrical microwave device is, there is widely used a FET series device as a three-terminal device. In recent, there are actively studied a resonant tunneling diode, etc. using a tunneling phenomenon through the barrier structure.

Furthermore, there is generally used an optical modulator which modulates an optical signal by inducing an electro-refraction and electro-absorption effect of an intrinsic layer by means of an exterior electrical signal of the PIN diode structure. Recently, there are actively studied optical modulators using polymer or organic. However, the technique of the above-mentioned two devices is limited to an independent type's optical and electrical signal control technique.

SUMMARY OF THE INVENTION

Accordingly, the present invention is not limited to a conventional electrical oscillator, which is applied to a wire/wireless integration communication network device by inducing the inter-connection of the electrical signal and optical signal upon generating and modulating the optical signal and electrical signal at the same frequency.

Therefore, an object of the invention is to solve the above-mentioned problems involved in the conventional photo-induced electo-optic oscillator and to provide a photo-induced electo-optic oscillator of an useful device to the independent electrical and optical purpose upon generating and modulating the electrical signal and optical signal of a high efficiency in a single integrated device with together a device which can perform an integrated function of the electrical-optical signal.

In accordance with one aspect, the present invention provides a photo-induced electo-optic oscillator comprising: a semi-insulating compound semiconductor substrate; an edge-emitting semiconductor laser diode which is formed on the semiconductor substrate, emits laterally a laser light of an exciton absorption wavelength band having a maximum optical absorption by a constant intensity; and a waveguide PIN diode which is formed such that an optical active layer on the semiconductor substrate can receive the laser light, generates a modulated optical signal by a frequency identical to an electrical oscillation frequency due to an absorption ratio variation of the optical signal incident constantly by electrically oscillating the optical active layer upon applying a direct current voltage to a negative resistance voltage section when a photocurrent voltage characteristic has a negative resistance characteristic by means of the laser light emitted from the edge-emitting semiconductor laser diode.

In accordance with another aspect, the present invention provides a photo-induced electo-optic oscillator comprising: a semi-insulating compound semiconductor substrate; a surface-emitting semiconductor laser diode which is formed on the semiconductor substrate, emits vertically a laser light of an exciton absorption wavelength band having a maximum optical absorption by a constant intensity; and a vertical PIN diode which is joined in a chip bonding method to be vertically expanded, integrated on the surface-emitting semiconductor laser diode, formed such that an optical active layer can receive the laser light of the surface-emitting semiconductor laser diode, generates a modulated optical signal by a frequency identical to an electrical oscillation frequency due to an absorption ratio variation of the optical signal incident constantly by electrically oscillating the optical active layer upon applying a direct current voltage to a negative resistance voltage section when a photocurrent voltage has a negative resistance characteristic by means of the laser light emitted from the surface-emitting semiconductor laser diode.

The present invention relates to a device which generates the electrical signal and optical signal of the same frequency by simultaneously performing the optical signal modulation on the frequency identical to the electrical signal accompanied by the electrical oscillation in the form of a single device.

The present invention forms a semiconductor photodetector upon constructing a PIN diode using a semiconductor multiple quantum well structure as an intrinsic absorption layer by utilizing the electro-optic effect of a GaAs compound semiconductor material. The semiconductor multiple quantum well structure used as the intrinsic layer of the PIN diode has a very excellent electrical-optical absorption effect, the optical absorption quantity decides the photocurrent quantity of the PIN diode. If the reverse bias voltage is applied upon illuminating the laser light of the wavelength having the maximum absorption, the photocurrent of the PIN diode shows the negative resistance characteristic. If DC-voltage is applied to the negative resistance voltage region with respect to the semiconductor diode of the photo-induced negative resistance characteristic, the PIN diode circuit causes the oscillation similar to the tunnel diode. At this time, the AC voltage characteristic of the oscillating diode oscillates the intrinsic layer of the PIN diode. There is changed the absorption ratio of the optical signal incident constantly by oscillating the intrinsic layer as above. Accordingly, the optical signal outputted is modulated with the frequency identical to the electrical oscillation frequency.

The electrical oscillation and optical modulation condition changes the negative resistance condition and the electrical oscillation amplitude and the electrical-optical absorption variation amplitude due to the electrical oscillation amplitude. Accordingly, in order to improve the negative resistance characteristic, the photocurrent difference should be large because of having the large optical absorption difference with respect to the small voltage variation. Therefore, the extinction ratio of the output modulation optical signal and signal difference characteristic are improved because the absorption ratio difference of the optical signal becomes large according as the photocurrent difference is large.

The horizontal integrated electrical-optical induced electrical optical oscillator of one characteristic of the present invention is composed of a waveguide type PIN diode structure and the edge-emitting semiconductor laser diode integrated on the semi-insulating compound semiconductor substrate. The waveguide type PIN diode is that the optical active layer having the electrical-optical absorption variation is used as the intrinsic layer. The edge-emitting semiconductor laser diode is integrated on the semiconductor substrate in order to illuminate the laser light to the intrinsic layer of the waveguide type PIN diode. Further, the wavelength of the semiconductor laser diode has the wavelength band which can induce the electrical-optical absorption variation in the intrinsic layer of the waveguide type PIN diode. In addition, the waveguide type PIN diode and semiconductor laser diode are the electrical insulating state, have the respective independent power sources. The waveguide type PIN diode has a subsidiary circuit for extracting the alternating current and an stable oscillation of the PIN diode. The photo-induce electro-optic oscillator is used as array on the substrate surface, thus can be used to generate the parallel optical signal in the horizontal direction of the substrate.

The vertical integrated, expanded photo-induced electo-optic oscillator of another characteristic of the present invention is composed of the vertical type PIN diode and the surface-emitting semiconductor laser diode structure integrated on the semi-insulating compound semiconductor substrate. The vertical PIN diode uses an optical active layer having the electo-absorption as the intrinsic layer, the surface-emitting semiconductor laser diode is integrated in order to illuminate the laser light on the intrinsic layer of the vertical PIN diode. Further, the laser wavelength of the surface-emitting semiconductor laser diode has the wavelength band which can induce the optical absorption variation in the vertical type PIN diode. In addition, the vertical type PIN diode and surface-emitting semiconductor laser diode are electrically the insulating state, have the respective independent power sources. The vertical type PIN diode has a subsidiary circuit for extracting the alternating current and an stable oscillation of the PIN diode. The photo-induce electro-optic oscillator is used as array on the substrate surface, thus can be used to generate the parallel optical signal in the vertical direction of the substrate.

BRIEF DESCRIPTION OF THE DRAWINGS

The above and other objects and features of the present invention will become apparent from the following description of preferred embodiments, when taken in conjunction with the accompanying drawings, in which.

DETAILED DESCRIPTION OF THE PREFERRED EMBODIMENTS

Hereinafter, the preferred embodiments of the present invention will be explained in detail according to the attached drawings.

The preferred embodiment of the present invention is that an intrinsic layer in the PIN diode used as a multiple quantum well of 50 nm $Al_xGa_{1-x}As$/100 nm GaAs, and Al mole fraction x value was 0.05 and less to maintain a high optical absorption variation at low voltage variation. The thickness of the intrinsic layer can be 0.5 μm and less to maintain a high electric field by means of a low voltage variation, 0.35 μm in one example of the present invention. The PIN structure is vertically integrated to improve a photocurrent quantity, the optical absorption becomes large by integrating a semiconductor mirror layer to the bottom in the embodiment. The optical absorption is regulated by controlling the length of a waveguide in case of a horizontal structure, the voltage can be regulated from PIN thickness.

The optical absorption peak formed by the multiple quantum well structure of the intrinsic layer, namely, since the optical absorption variation is maximum according to the electric field at the exciton absorption wavelength, the illumination laser wavelength used in the near of the exciton wavelength.

Figure 6:
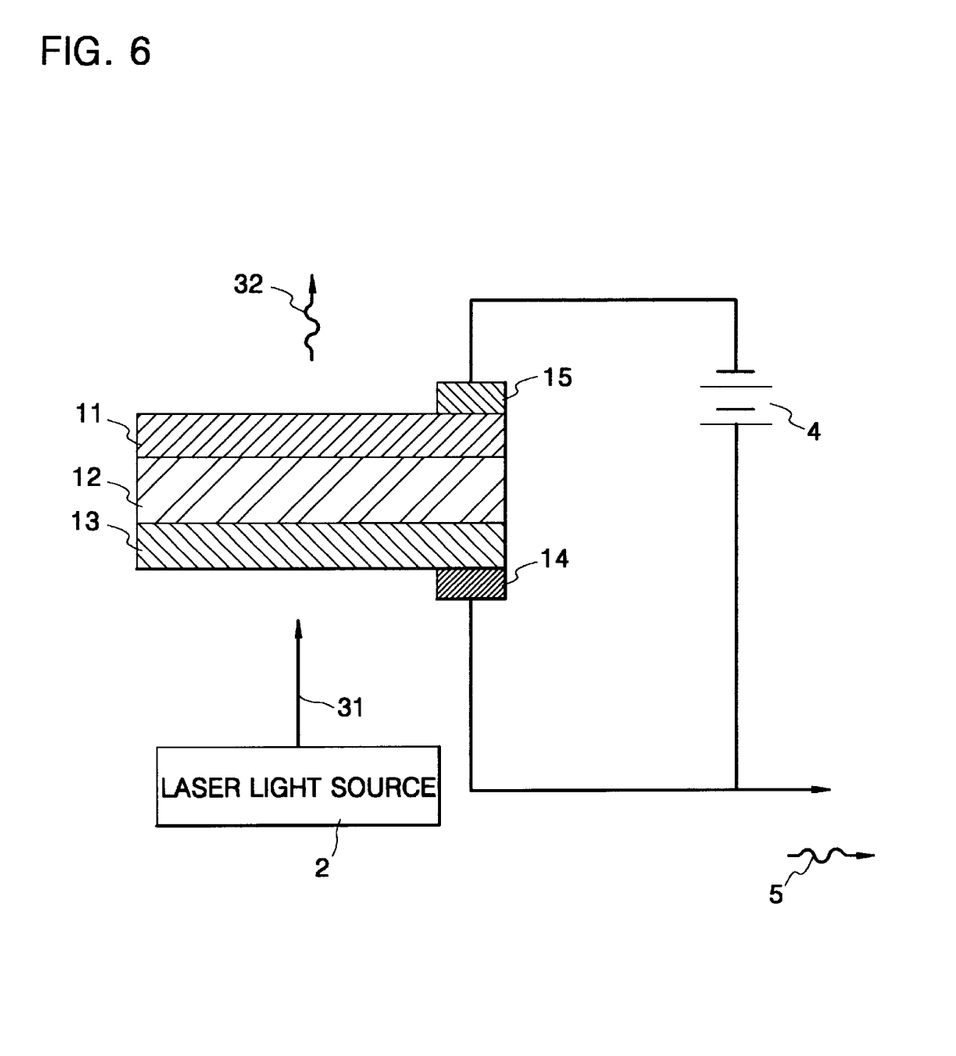
FIG. 6 is a whole conception view of the present invention.

The general conceptive view according to the present invention is shown in FIG. 6.

As shown in FIG. 6, after joining a n-type ohmic metal pad layer 14 to a n-type semiconductor electrode layer 13 and a p-type ohmic metal pad layer 15 to the p-type semiconductor electrode layer 11 of the PIN diode composed of the P-type semiconductor electrode layer 11, the multiple quantum well intrinsic layer 12 having electro-optical absorption, and the n-type semiconductor electrode layer 13, when the photo current-voltage characteristic has a negative resistance by a constant illumination beam 31 of a laser light source 2, the electrical oscillation of the PIN diode is caused by applying a constant voltage 4 to the negative resistance voltage, the optical absorption variation is outputted 32 upon modulating a constant illumination beam 31 by means of electric field variation induced to the intrinsic layer 12 of the PIN diode by the induced self oscillation alternating current signal 5. The intrinsic layer, MQW, of the PIN diode has the electro-absorption effect which varies the optical absorption according to the voltage variation, if the voltage of the PIN diode is oscillated by means of the diode self oscillation, the optical signal modulation is generated by varying the intrinsic electric field strength and generating the optical absorption ratio variation identical to the electrical oscillation frequency.

Accordingly, the optical signal modulation 32 can be simultaneously generated by the same frequency as well as the electrical alternating current signal 5.

Hereinafter, the specific embodiments of FIG. 6 will be explained in detail.

Figure 1:
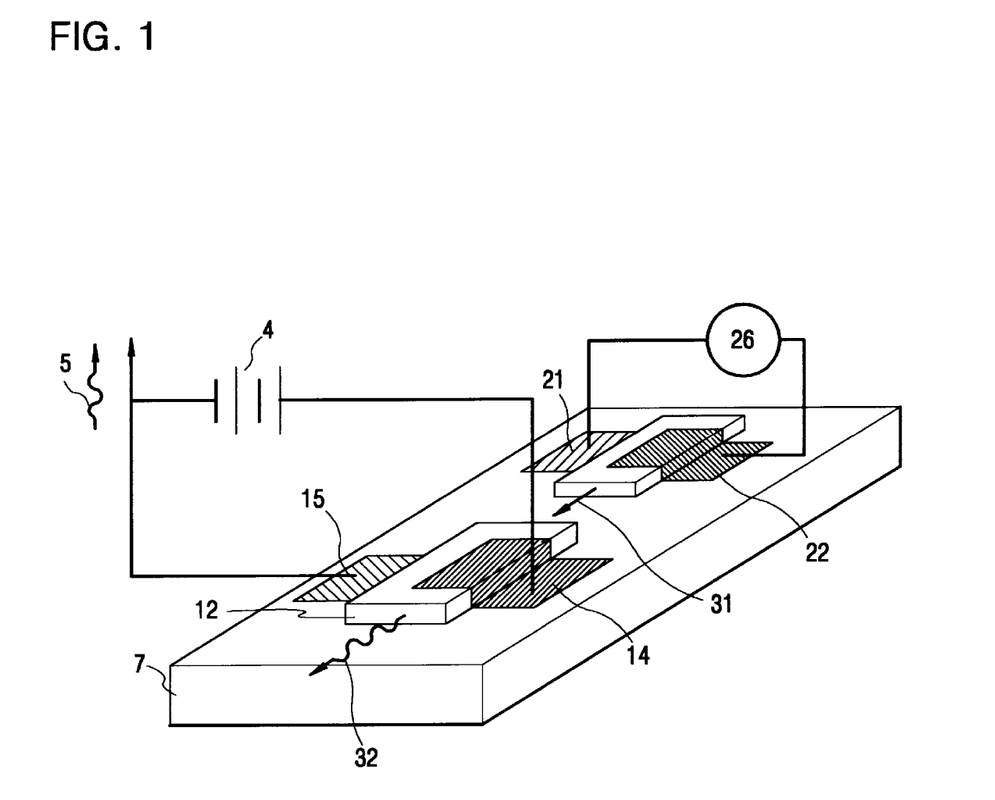
FIG. 1 is a sectional view showing a photo-induced electo-optic oscillator structure horizontally integrated, expanded, as one example of the present invention.

FIG. 1 is one example of the present invention, which shows a photo-induced electro-optic oscillator horizontally integrating an edge-emitting semiconductor laser diode and a waveguide type PIN diode on a semi-insulating compound semiconductor substrate. In the photo-induced electro-optic oscillator according to the present invention, one edge-emitting semiconductor laser diode and one waveguide type PIN diode are used as one example, however, not limited to this embodiment, a parallel optical signal can be generated in the horizontal of the substrate by constructing array form on the substrate surface.

If examine the construction with referring to FIG. 1, there are composed of a semi-insulating compound semiconductor substrate 7, an edged-emitting semiconductor laser diode 110 which is formed on the semiconductor substrate 7, emits laterally a laser light 31 of the exciton absorption wavelength band having maximum optical absorption by means of a constant intensity, and a waveguide type PIN diode 120 which forms in order that the optical active layer on the semiconductor substrate 7 can receive the laser light, and generates an light signal 32 modulated by the frequency identical to the electrical oscillation frequency by means of the absorption ratio of the light signal incident constantly by oscillating the optical active layer upon applying a constant voltage to a negative resistance voltage when a photocurrent has a negative resistance characteristic by the laser light 31 emitted from the edge-emitting semiconductor laser diode 110. The edge-emitting semiconductor laser diode 110 and the waveguide type PIN diode 120 as mentioned above are electrically an insulating state and integrated horizontally on the same semiconductor substrate 7.

If examine the specific structure of the edge-emitting semiconductor laser diode 110 as described above, it is composed of an edge-emitting semiconductor laser diode power source 26a independent with the waveguide type PIN diode 120 driving power source(using the direct current constant voltage) for laser oscillation, a p-type metal electrode layer 21, a n-type metal electrode layer 22, and an edge-emitting laser diode active layer 34 emitting laterally the laser light when applying the power source 26a to each metal electrode layer 21, 22, formed between the metal electrode layers 21, 22.

Furthermore, the waveguide type PIN diode 120 is composed of a waveguide type PIN diode driving power source 4 independent with the edge-emitting semiconductor laser diode 110 to apply the constant voltage to the negative resistance voltage section when the photocurrent-voltage characteristic has the negative resistance by means of the laser light 31 illuminated from the edge-emitting semiconductor laser diode 110, a n-type ohmic metal pad layer 14 positioned in the upper, a p-type ohmic metal pad layer 15 positioned on the lower, an optical absorption multiple quantum well intrinsic layer 12( for example, 50 nm $Al_xGa_{1-x}As$/100 nm GaAs multiple quantum well layer, x is 0.05 and less) which formes between the n-type and p-type electrodes 14, 15 and generates the light signal 32 modulating the laser light 31 incident constantly by means of the optic absorption ratio variation due to the electric field variation induced by the self oscillation alternating current signal 5 generated by means of the constant voltage applied to the metal electrodes 14, 15.

The operation of the construction as above is as follows.

The PIN diode 120 structure is manufactured as the waveguide type, the edge-emitting laser diode is integrated horizontally on the same substrate as the light source. The laser light 31 inputted from the edge-emitting semiconductor laser diode 110 by the constant intensity induces the electrical oscillation 5 upon being applied to the negative resistance region of the PIN diode by means of a reverse directional constant voltage 4. The input laser light 31 modulates the output light coincident with the electrical oscillation frequency by means of this electrical oscillation. The thickness of the optical absorption multiple quantum well intrinsic layer 12 is regulated to 0.5 $\mu$m and less 0.35 $\mu$m in this embodiment) to induce the high electric field by means of the low voltage variation in the waveguide type PIN diode structure, therefore, to regulate the alternating current oscillation amplitude.

The optical signal modulation such as the conventional optical modulation can be obtained at the exterior constant voltage condition according to regulating the modulated optical signal difference, and the modulated optical extinction ratio of the output optical signal by controlling the length of the waveguide. Further, the electrical self oscillation alternating current signal 5 is taken out through the n-type and p-type ohmic metal pad layers 14, 15 of the PIN diode, as a result, it can be used as the electrical signal oscillator.

Figure 2:
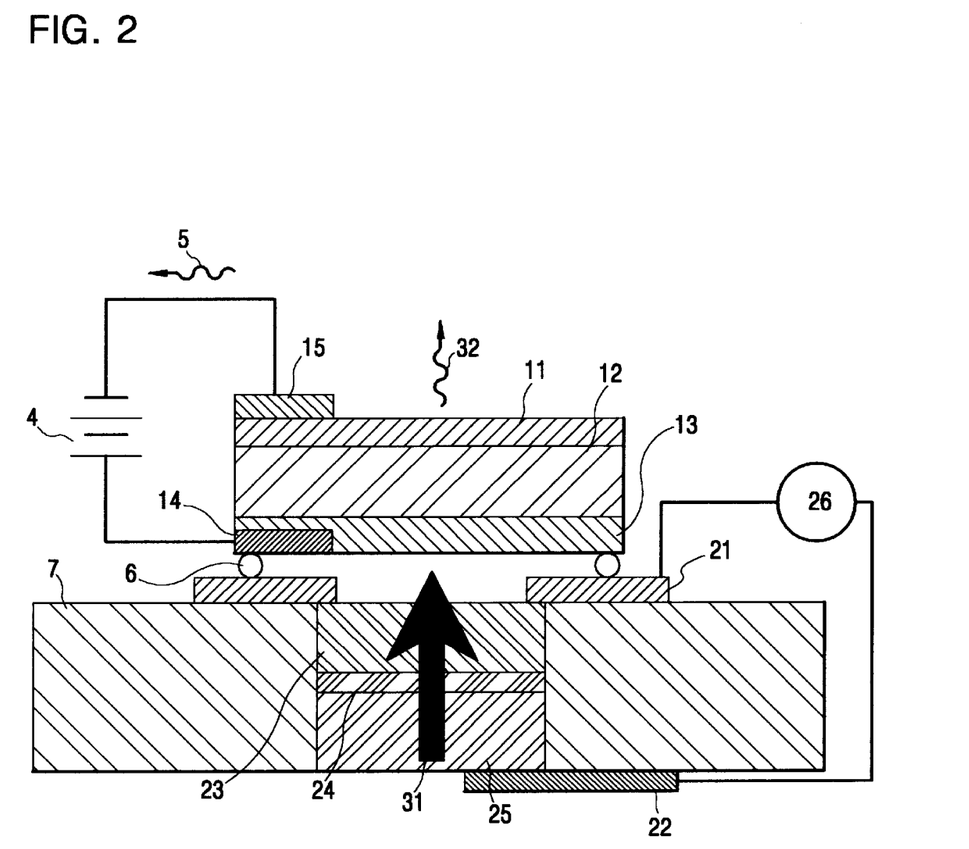
FIG. 2 is a sectional view showing a photo-induced electo-optic oscillator structure vertically integrated, expanded, as another example of the present invention.

FIG. 2 is another embodiment of the present invention, which shows a photo-induced electro-optical oscillator in the form of integrating and expanding vertically the vertical structure type PIN diode using the surface emitting semiconductor laser diode 210 as the light source. In the photo-induced electro-optic oscillator according to the present invention, a surface emitting semiconductor laser diode and a vertical type PIN diode are used as one example, however, not limited to this embodiment, a parallel optical signal can be generated in the vertical direction of the substrate by being constructed in the form of array on the substrate surface.

With referring to FIG. 2, the photo-induced electro-optical oscillator according to the present invention is composed of a semi-insulating compound semiconductor substrate 7, a surface-emitting semiconductor laser diode 210 which is formed on the semiconductor substrate 7, emits vertically a laser light 31 of the exciton absorption wavelength band having the maximum optical absorption by a constant intensity, and a vertical type PIN diode 220 which is joined in the chip bonding method for the vertical expanded integration on the surface emitting semiconductor laser diode 210, form ed in order that the optical active layer on the semiconductor substrate 7 can receive the laser light of the surface emitting semiconductor laser diode 210, and generates the optical signal 32 modulated by the frequency identical to the electrical oscillation frequency by means of varying the absorption ratio of the optical signal incident constantly by oscillating the optical active layer upon applying a constant voltage to a negative resistance voltage when a photocurrent has the negative resistance characteristic by the laser light 31 vertically emitted from the surface emitting semiconductor laser diode 210. The surface emitting semiconductor laser diode 210 and a vertical type PIN diode 220 as mentioned above are electrically the insulating state and integrated vertically on the same semiconductor substrate 7.

If examined, the specific structure of the surface emitting semiconductor laser diode 210 described above, it is composed of a p-type lower mirror layer 23, the surface emitting semiconductor laser diode active layer 24 and a n-type upper mirror layer 25, a p-type metal electrode layer 21 formed between the upper surface of the n-type upper mirror layer 25 and the junction bonded by means of a chip to the vertical PIN diode, a n-type metal electrode layer 22 formed to the lower surface of the p-type lower mirror layer 23, and a surface emitting semiconductor laser diode power source 26b applying the power source to the p-type and n-type metal electrode layers 21, 22 to emit the laser light 31 having the exciton absorption wavelength in the surface direction (vertical) toward the intrinsic layer 12 of the optical active layer, integrated in series to increase the optical absorption to the semi-insulating semiconductor substrate 7.

Furthermore, the vertical type PIN diode 220 is composed of a vertical type PIN diode driving power source 4 independent with the surface emitting semiconductor laser diode 210 to apply the constant voltage to the negative resistance voltage when the photocurrent-voltage characteristic has the negative resistance by means of the laser light 31 illuminated from the surface emitting semiconductor laser diode 210, a n-type ohmic metal pad layer 14 positioned on the lower and partially formed to the n-type electrode layer 13, a p-type ohmic metal pad layer 15 positioned on the upper and partially formed to the p-type electrode layer 11, and an optical absorption multiple quantum well intrinsic layer 12 (for example, 50 nm $Al_xGa_{1-x}As$/100 nm GaAs multiple quantum well layer, x is 0.05 and less) which generates the optical signal 32 modulating the laser light 31 incident constantly by means of the optic absorption ratio variation due to the electric field variation induced by the self oscillation alternating current signal 5 generated by means of the constant voltage by applying the vertical PIN diode driving power source 4b (direct current constant voltage) to the n-type and p-type ohmic metal pad layers 14, 15.

At this time, the vertical PIN diode is constructed in the form of transmission, the device surface of the diode is processed by the anti-reflection layer.

The oscillator operation according to the present embodiment as constructed above is omitted because of being identical with the principle of FIG. 1 except that an input laser light and output modulated optical are generated in the vertical direction of the device structure. The construction of this embodiment has an advantage that there is possible the integration of array form for free space optical processing since the modulated power source can be emitted vertically.

Figure 3:
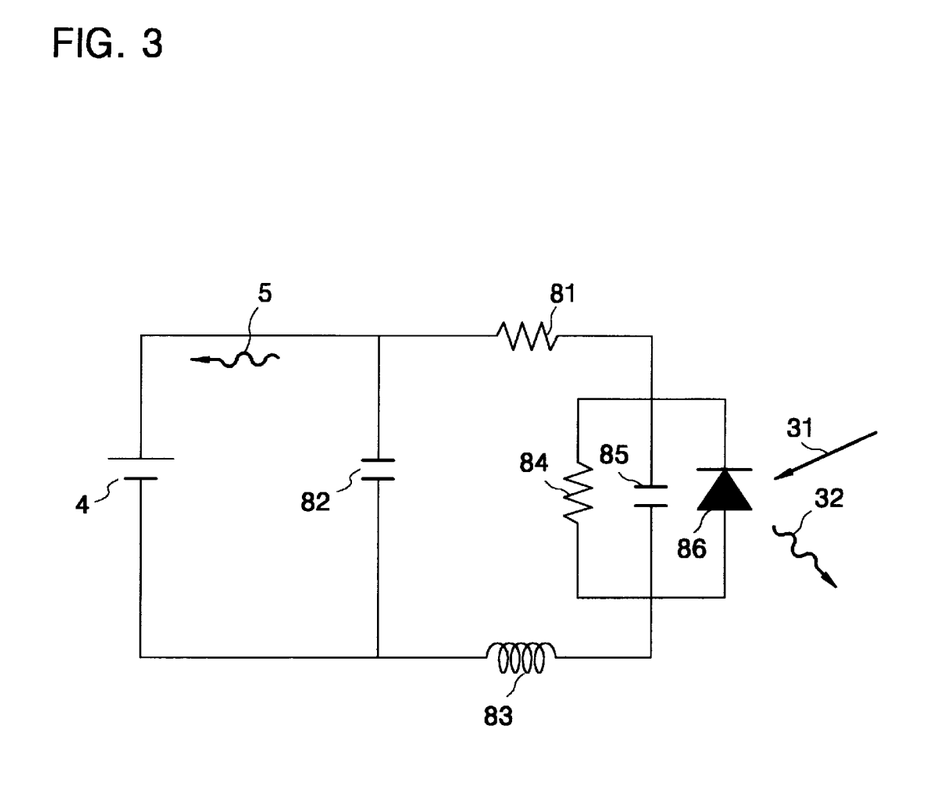
FIG. 3 is a view illustrating a simple equivalent circuit of a PIN diode circuit section in FIGS. 1, 2.

FIG. 3 shows an equivalent circuit of the PIN diode section in FIGS. 1 and 2.

The PIN diode is composed of a negative resistance component 84 showing the negative resistance characteristic of the photocurrent decrease due to decreasing the optical absorption to the reverse direction voltage, a diode capacitor 85 parallel to the negative resistance, a diode 86 to be constructed additionally in parallel for improving the optical absorption ratio, a series resistance 81 contacted with the PIN diode in series, an exterior parallel capacitor 82 for helping a stable circuit oscillation and a direct current power source 4 for applying a constant voltage(d.c. bias voltage) to the PIN diode. The stable operation condition of the PIN diode can be made by a simple equivalent circuit view.

Figure 4:
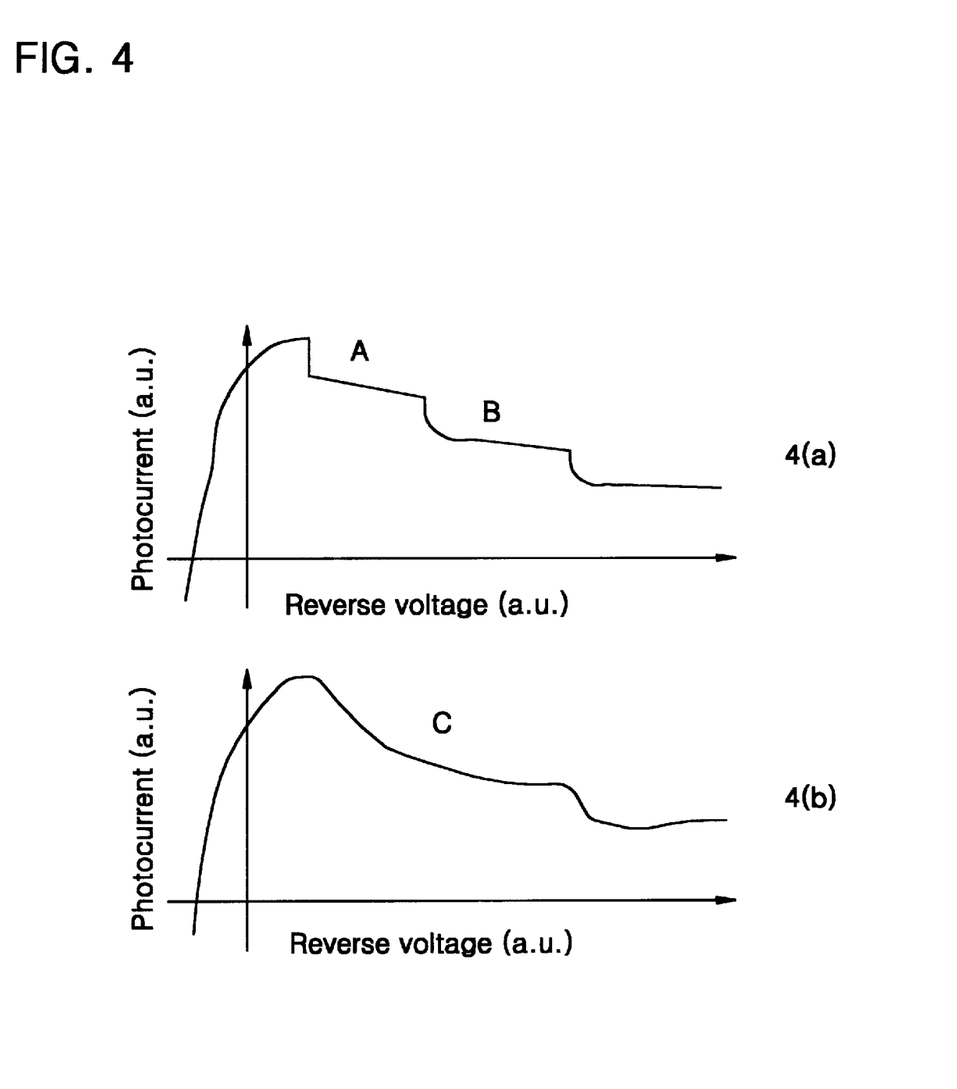
FIG. 4 is a view illustrating a negative resistance photocurrent-voltage characteristic according to an optical illumination in a simple PIN diode circuit section according to one example of FIG. 3, (a) illustrates when an exterior parallel capacitor 82 of FIG. 3 is not added, (b) illustrates a parallel capacitor added.

FIGS. 4 (*a*), (*b*) shows an embodiment of a characteristic curve of a photocurrent according to the reverse D.C.-bias voltage variation during illuminating an intense laser light to the PIN diode on the equivalent circuit of FIG. 3.

FIG. 4(*a*) has not an exterior parallel capacitor 82, FIG. 4(*b*) is an example of a photocurrent-voltage characteristic curve obtained after adding a parallel capacitor. In the drawing, A voltage band is an instable circuit oscillation band, B,C voltage band is an stable diode oscillation band.

Figure 5:
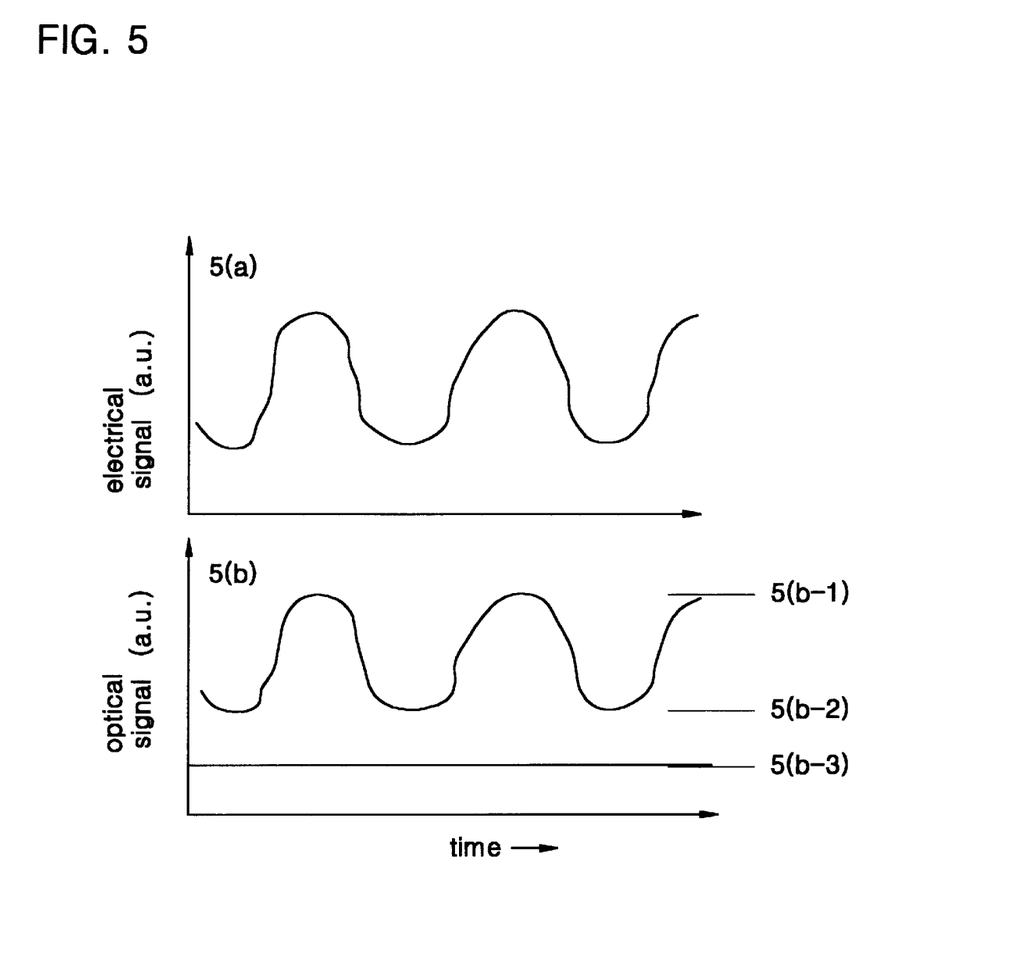
FIG. 5 is one example of an electrical AC signal and modulated-optical output characteristic at a negative resistance characteristic voltage band of the PIN diode in FIG. 4, and (a) illustrates an electrical AC signal at an stable B, C voltage band, (b) illustrates a modulated optical output.

FIG. 5 shows an alternating current oscillation characteristic and optical modulated characteristic in the voltage band A, B, C in the photocurrent-voltage characteristic curve. The section of the voltage band exists only A section according to the diode circuit condition, or exists the section A and B simultaneously. The addition of the exterior parallel capacitor is that the characteristic curve becomes a stable C voltage section. The section B, C has very stable electrical oscillation, the section A deteriorates the quality of signal generated by accompanying the PIN diode oscillation due to adding a bias circuit oscillation by means of the circuit instability. The alternating current amplitude generated nearly accords with the voltage amplitude of the section A-B, or C, therefore the modulated value of an optical output accords with the absorption ratio difference at the boundary voltage of the section.

FIGS. 5 (*a*), (*b*) show one example of an electrical oscillation signal and optical modulation signal characteristic respectively. The frequency of the optical modulation signal accords with that of the electrical signal.

The optical modulation characteristic in FIG. 5(*b*), the signal values of the modulation signal on state and off state are respectively obtained in the designated absolute values distinguished such as 51, 52 in the drawing numeric with respect to the optical ground state 54.

As an example of the present invention, there was generated an alternating current signal 5 of about 40 MHz frequency by means of illuminating a constant amplitude laser input light 31 incident to the PIN diode corresponding to the absorption peak of the multiple quantum well of the intrinsic layer from the PIN diode 86 of 5 pF diode capacitor 85, there were obtained the modulated optical signal difference 23% and the optical signal extinction ratio 2.2:1 by means of this alternating current signal. Further, the alternating current frequency can be regulated due to controlling a diode capacitance 85 and a resistance 81, a capacitance 82, and an inductance 83. In addition, there can be greatly improved the optical modulated signal characteristic by means of a signal electrically obtained by regulating the absorption layer due to maximizing the optical absorption variation of the PIN diode.

Especially, the integration of a semiconductor laser diode and PIN diode structure as devised in FIGS. 1 and 2 minimizes the circuit instability element and minimizes and lightens the whole device, and improves the trust, therefore, to make a high frequency electrical signal generation and high frequency optical signal modulator of a high efficiency.

The respective PIN diode described above can be additionally connected to a diode in parallel in order to improve the negative resistance characteristic and have a resonant structure by means of a mirror layer, the respective PIN diode is that the thickness ratio and composition of the intrinsic layer structure material are regulated to control the oscillation frequency and the amplitude, thus there can be regulated an impurity doping and material composition of a semiconductor electrode.

Furthermore, the respective PIN diode has the optimum condition in order to modulate an optical signal enough by means of the amplitude of electrical alternating current signal. That is, the respective PIN diode is that the optical intrinsic active layer has the optimum intrinsic layer thickness having the optimum optical absorption variation at the given voltage variation, it has the optimum numbers of parallel PIN diode for the maximum optical absorption by means of the optimum intrinsic layer thickness, the optical intrinsic active layer has a multiple quantum well structure constructed in the shape of the repeat layer of well material and barrier material of the compound semiconductor.

The present invention induces the self diode oscillation by inducing the negative resistance characteristic of the diode due to illuminating an intense laser light to the multiple quantum well structure PIN diode having the optical absorption variation by means of the electric field-induction, obtains a high frequency modulated optical output signal as well as a high frequency electrical signal upon improving the modulated characteristic of the incident laser light due to designing a low negative resistance condition by means of the optical induction and the optimum optical absorption variation to the PIN diode structure at this oscillation condition, thereby can obtain the efficient operation upon integrating the part of a laser diode giving the circuit part and light source of the PIN diode on a substrate.

The photo-induced PIN diode electro-optic oscillator of the present invention as above can modulate the electrical circuit self oscillation signal from the photo-induced negative resistance characteristic as well as an optical output of a constant intensity induced thereby. Accordingly, the present invention has a possibility of applying an exchange of the electro-optic signal and the optical exchange, wire and wireless signal processing, etc.

As described above, although the present invention has been described in detail with reference to illustrative embodiments, the invention is not limited thereto and various modifications and changes may be effected by one skilled in the art within the scope of the invention.

What is claimed is:

1. A photo-induced electro-optic oscillator comprising:
   a semi-insulating compound semiconductor substrate;
   an edge-emitting semiconductor laser diode formed on said semiconductor substrate, for emitting laterally a laser light of an excitation absorption wavelength band with a constant intensity, the excitation absorption wavelength band having a maximum optical absorption; and
   a waveguide PIN diode which is formed such that an optical active layer on the semiconductor substrate can receive said laser light, the waveguide PIN diode generating an optical signal modulated by a frequency identical to an electrical oscillation frequency when a photocurrent-voltage relation has a negative resistance characteristic due to said laser light emitted from said edge-emitting semiconductor laser diode, the optical signal being modulated by changing an absorption ratio of the constantly incident optical signal, the absorption ratio being changed by electrically oscillating said optical active layer, said optical active layer being oscillated by applying a D.C. voltage to a negative resistance voltage region.

2. The electro-optic oscillator according to claim 1, wherein said edge-emitting semiconductor laser diode comprises:
   an edge-emitting semiconductor laser diode power source independent with a driving power source of said waveguide PIN diode for laser oscillation;
   a p-type metal electrode layer; a n-type metal electrode layer; and
   an edge-emitting laser diode active layer which is formed between said metal electrode layers, emits laterally the laser light when said power source is applied to the respective metal electrode layers.

3. The electro-optic oscillator according to claim 1, wherein said waveguide type PIN diode comprises:
   a waveguide type PIN diode driving power source independent with said edge-emitting semiconductor laser diode for applying a D.C. voltage to a negative resistance voltage region when a photocurrent-voltage relation has the negative resistance characteristic due to the laser light illuminated from said edge-emitting semiconductor laser diode;
   an n-type ohmic metal pad layer positioned on the top thereof;
   an n-type ohmic metal pad layer positioned on the lower thereof, and
   an optical absorption multiple quantum well intrinsic layer formed between said n-type and p-type electrode layers, for generating an optical signal which modulates the constantly incident laser light, the constantly incident laser light being modulated by changing the optical absorption ratio, the optical absorption ratio being changed by changing an electric field, the electric field being changed by self oscillation alternating current signal, the self oscillation alternating current signal being generated by DC voltage applied to p-type and n-type the metal electrode layers.

4. The electro-optic oscillator according to claim 1, wherein said waveguide type PIN diode further comprises adding a diode in parallel to improve a negative resistance characteristic of the photocurrent-voltage relation.

5. The electro-optic oscillator according to claim 3, wherein an intrinsic layer of said PIN diode is a heterojunction compound semiconductor multiple quantum well layer.

6. The electro-optic oscillator according to claim 3, wherein in said waveguide type PIN diode, a thickness ratio and composition of the intrinsic layer structure material are regulated and the impurity doping of the semiconductor electrode and the material composition are regulated in order to control an oscillation frequency and amplitude.

7. The electro-optic oscillator according to claim 1, wherein said edge-emitting semiconductor laser diode and said waveguide PIN diode are arranged as an array on the substrate so as to generate a parallel optical signal in the horizontal direction of the substrate.

8. An electro-optic oscillator comprising:
   a semi-insulating compound semiconductor substrate;
   a surface-emitting semiconductor laser diode formed on said semiconductor substrate, for emitting vertically a laser light of an excitation absorption wavelength band having a maximum optical absorption with a constant intensity; and
   a vertical PIN diode which is joined in a chip bonding method to be vertically expanded, integrated on said surface-emitting semiconductor laser diode, and formed such that an optical active layer can receive said laser light of said surface-emitting semiconductor laser diode, the vertical PIN diode generating an optical signal modulated by a frequency identical to an electrical oscillation frequency when a photocurrent-voltage relation has a negative resistance characteristic due to said laser light emitted from said surface-emitting semiconductor laser diode, the optical signal being modulated by changing an absorption ratio of the constantly incident optical signal, the absorption ratio being changed by electrically oscillating said optical active layer, said optical active layer being oscillated by applying a D.C. voltage to a negative resistance voltage region.

9. The electro-optic oscillator according to claim 8, wherein said surface-emitting semiconductor laser diode comprises:

a p-type lower mirror layer, a surface-emitting semiconductor laser diode active layer, and a n-type upper mirror layer stacked in series to increase the optical absorption on the semi-insulating semiconductor substrate;

a p-type metal electrode layer formed between a surface of said n-type upper mirror layer and a chip-junction bonded to said vertical type PIN diode;

an n-type metal electrode layer formed to a lower surface of said p-type lower mirror layer; and a surface-emitting semiconductor laser diode power source for applying the power source to said p-type and n-type metal electrode layers to emit the laser light having the exciton absorption wavelength to said optical active layer.

10. The electro-optic oscillator according to claim 8, wherein said vertical type PIN diode comprises:

a vertical type PIN diode driving power source independent of said surface-emitting semiconductor laser diode, for applying a D.C. voltage to a negative resistance voltage region when a photocurrent-voltage relation has the negative resistance characteristic due to the laser light illuminated from said surface-emitting semiconductor laser diode;

an n-type ohmic metal pad layer positioned on the lower thereof and partially formed on an n-type electrode layer;

a p-type ohmic metal pad layer positioned on the upper thereof and partially formed to a p-type electrode layer; and an optical absorption multiple quantum well intrinsic layer for generating an optical signal, the optical signal modulating the constantly incident laser light by changing the optical absorption ratio, the optical absorption ratio being changed by changing an electric field, the electric field being changed by self oscillation alternating current signal, the self oscillation alternating current signal being generated by DC voltage when the vertical PIN diode driving power source is applied to said n-type and p-type ohmic metal pad layers.

11. The electro-optic oscillator according to claim 10, wherein an intrinsic layer of said PIN diode is a heretojunction compound semiconductor multiple quantum well layer.

12. The electro-optic oscillator according to claim 8, wherein said vertical type PIN diode a thickness ratio and composition of the intrinsic layer structure material are regulated and the impurity doping of the semiconductor electrode and the material composition are regulated in order to control an oscillation frequency and amplitude.

13. The electro-optic oscillator according to claim 8, wherein said photo-surface-emitting semiconductor layer diode and said vertical PIN are arranged as an array on the substrate so as to generate a parallel optical signal in the horizontal direction of the substrate.

* * * * *